(12) United States Patent
Carcone et al.

(10) Patent No.: US 10,707,633 B2
(45) Date of Patent: Jul. 7, 2020

(54) PLUG FOR AN UNDERSEA CABLE

(71) Applicant: RAYTHEON COMPANY, Waltham, MA (US)

(72) Inventors: John Carcone, Portsmouth, RI (US); Curtis B. Carlsten, Seekonk, MA (US); Peter M. Willey, Portsmouth, RI (US)

(73) Assignee: RAYTHEON COMPANY, Waltham, MA (US)

( * ) Notice: Subject to any disclaimer, the term of this patent is extended or adjusted under 35 U.S.C. 154(b) by 97 days.

(21) Appl. No.: 16/144,500

(22) Filed: Sep. 27, 2018

(65) Prior Publication Data
US 2020/0106228 A1    Apr. 2, 2020

(51) Int. Cl.
| | | |
|---|---|---|
| H01R 43/00 | (2006.01) |
| H01R 13/523 | (2006.01) |
| H01R 4/70 | (2006.01) |
| H01R 13/52 | (2006.01) |
| H01R 13/66 | (2006.01) |

(52) U.S. Cl.
CPC ............ *H01R 43/005* (2013.01); *H01R 4/70* (2013.01); *H01R 13/523* (2013.01); *H01R 13/5213* (2013.01); *H01R 13/5216* (2013.01); *H01R 13/6616* (2013.01)

(58) Field of Classification Search
CPC ............. H01R 43/005; H01R 13/5216; H01R 13/523; H01R 4/70; H01R 13/5213
USPC ........................................................ 174/73.1
See application file for complete search history.

(56) References Cited

U.S. PATENT DOCUMENTS

| | | | |
|---|---|---|---|
| 4,378,323 A | | 3/1983 | Brandeau |
| 4,595,256 A | * | 6/1986 | Guazzo ............... G02B 6/4401 385/69 |
| 4,834,479 A | * | 5/1989 | Adl ..................... G02B 6/4428 385/138 |
| 5,117,094 A | | 5/1992 | Jensen |
| 2016/0151965 A1 | | 6/2016 | Carlsten et al. |

OTHER PUBLICATIONS

ISR/WO, Issued Nov. 28, 2019, RAY0393PCT, 15 pages.

* cited by examiner

*Primary Examiner* — Sherman Ng
(74) *Attorney, Agent, or Firm* — Cantor Colburn LLP

(57) ABSTRACT

A plug for joining a polyethylene (PE) jacketed cable to a PE tube is provided. The plug includes first and second heating wires and a PE body. The PE body includes a first section and a second section. The first section is insertible into the PE tube and includes a first surface to engage with the PE tube. The first heating wires are embeddable in the first surface. The second section is within the first section and the PE jacketed cable is insertible into the second section. The second section includes a second surface to engage with the PE jacketed cable. The second heating wires are embeddable in the second section.

20 Claims, 3 Drawing Sheets

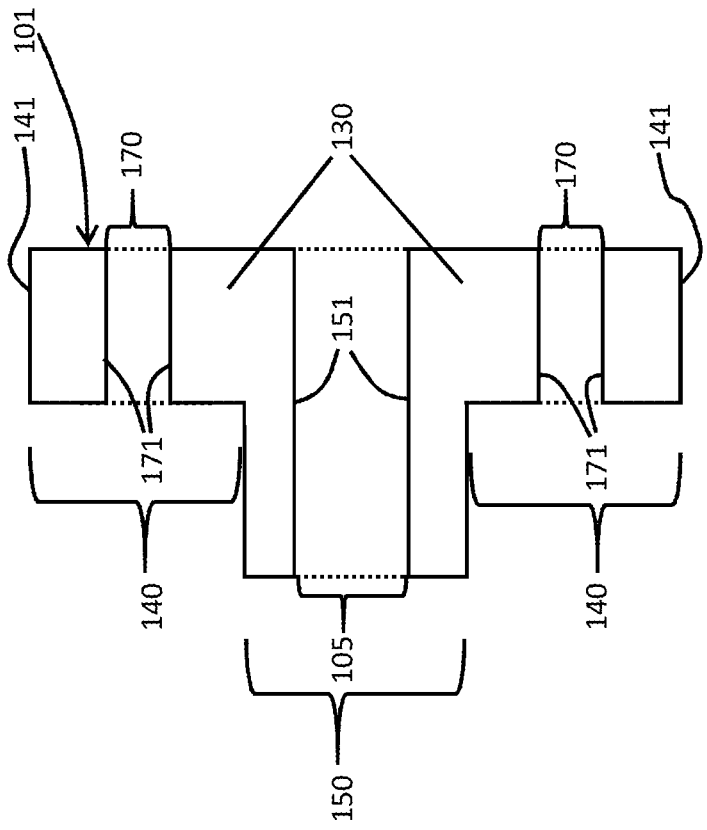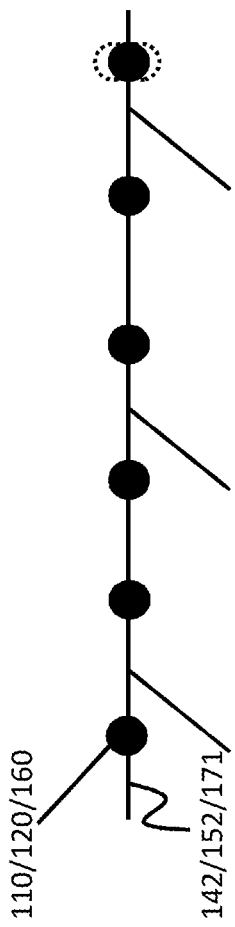

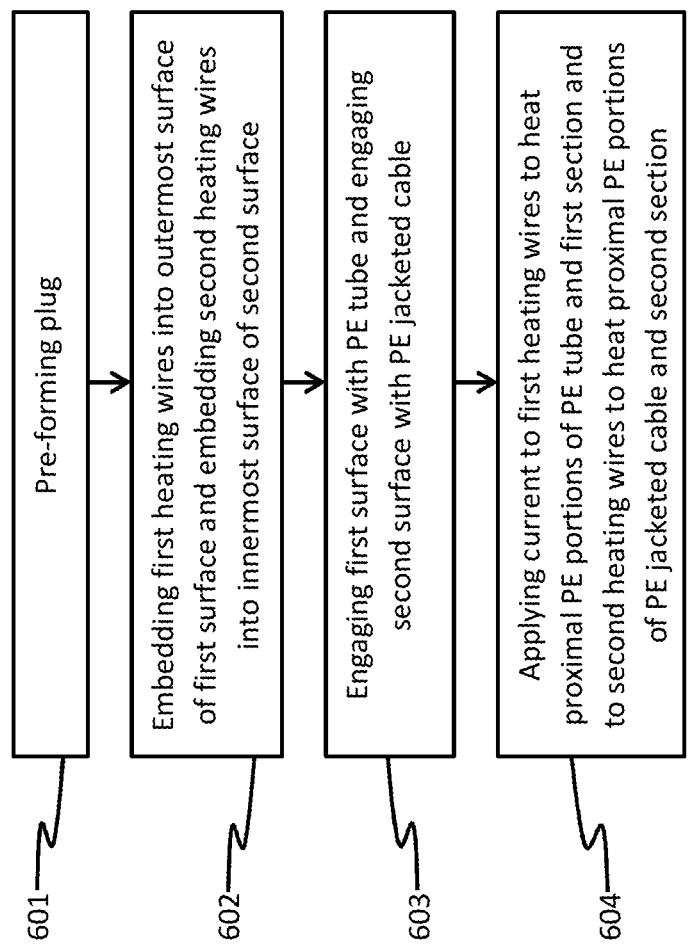

PLUG FOR AN UNDERSEA CABLE

BACKGROUND

The present disclosure relates to undersea cables and, more particularly, to plug for joining an undersea cable and another undersea cable with an encasement.

Undersea cable systems typically require that housings and cables be encapsulated with polyethylene (PE) in order to achieve long term life in seawater. Expensive molds are employed in current processes for forming the PE encapsulations and these processes can take a relatively long time to complete. That is, a significant investment in time and money is often required in order to achieve a high-strength durable cable with a PE housing overmold.

More particularly, traditional sub-sea signal cable splice interconnections can use a field applied termination element as the PE housing overmold. The cable splicing process involves strength member termination and fiber-optic conductor splicing and relies on the PE overmolding to achieve long term durability.

Meanwhile, natural gas and oil industries often use electrofusion to produce high quality inexpensive welding of high and medium density pipelines. Electrofusion can provide a controllable heating of pipes and fittings that results in a high pressure seal. In addition, the portability of electrofusion features is usually inexpensive and reliable heating systems are available to support field operations. Such electrofusion features may include heating elements that are integrated into fittings and current in the form of direct current (DC) provides the necessary power (at, e.g., 40 volts) to activate the heating elements. Once electrofusion is complete, pipes and fittings can be used underwater and, even though wire themselves may corrode over time, electrofusion joints will not be affected.

SUMMARY

According to one embodiment, a plug for joining a polyethylene (PE) jacketed cable to a PE tube is provided. The plug includes first and second heating wires and a PE body. The PE body includes a first section and a second section. The first section is insertible into the PE tube and includes a first surface to engage with the PE tube. The first heating wires are embeddable in the first surface. The second section is within the first section and the PE jacketed cable is insertible into the second section. The second section includes a second surface to engage with the PE jacketed cable. The second heating wires are embeddable in the second section.

In accordance with additional or alternative embodiments, the first and second sections are annular and co-axial and the second section is thicker than the first section.

In accordance with additional or alternative embodiments, the first surface is annular and faces radially outwardly and the second surface is annular and faces radially inwardly.

In accordance with additional or alternative embodiments, the first heating wires are embeddable in an outermost surface of the first surface and the second heating wires are embeddable in an innermost surface of the second surface.

In accordance with additional or alternative embodiments, the PE tube is formed to define a first bore receptive of the PE body and the second section is formed to define a second bore receptive of the PE jacketed cable.

In accordance with additional or alternative embodiments, additional heating wires are provided, at least one of the first section and the second section is formed to define one or more additional bores and the at least one of the first section and the second section has one or more additional surfaces at corresponding ones of the one or more additional bores in which the additional heating wires are embeddable.

In accordance with additional or alternative embodiments, the first section is formed to define the one or more bores as an annular array and each of the one or more of the additional bores is receptive of an additional PE jacketed cable which is smaller in diameter than the PE jacketed cable.

According to another embodiment, an assembly for joining first and second polyethylene (PE) jacketed cables is provided. The assembly includes a PE tube having first and second ends and first and second plugs. Each of the first and second plugs includes first and second heating wires and a PE body. The PE body includes a first section and a second section. The first section is insertible into one of the first and second ends of the PE tube and includes a first surface to engage with the one of the first and second ends of the PE tube. The first heating wires are embeddable in the first surface. The second section is within the first section and one of the first and second PE jacketed cables is insertible into the second section. The second section includes a second surface to engage with the one of the first and second PE jacketed cables. The second heating wires are embeddable in the second surface.

In accordance with additional or alternative embodiments, the first and second sections are annular and co-axial and the second section is thicker than the first section.

In accordance with additional or alternative embodiments, the first surface is annular and faces radially outwardly and the second surface is annular and faces radially inwardly.

In accordance with additional or alternative embodiments, the first heating wires are embeddable in an outermost surface of the first surface and the second heating wires are embeddable in an innermost surface of the second surface.

In accordance with additional or alternative embodiments, the PE tube is formed to define a first bore receptive of the PE body and the second section is formed to define a second bore receptive of the PE jacketed cable.

In accordance with additional or alternative embodiments, additional heating wires are provided, at least one of the first section and the second section is formed to define one or more additional bores and the at least one of the first section and the second section has one or more additional surfaces at corresponding ones of the one or more additional bores in which the additional heating wires are embeddable.

In accordance with additional or alternative embodiments, the first section is formed to define the one or more bores as an annular array and each of the one or more of the additional bores is receptive of an additional PE jacketed cable which is smaller in diameter than the PE jacketed cable.

According to yet another embodiment, a method of joining a polyethylene (PE) jacketed cable to a PE tube is provided. The method includes pre-forming a plug with a PE body that includes a first section insertible into the PE tube and including a first surface and a second section within the first section and into which the PE jacketed cable is insertible and including a second surface. The method further includes embedding first and second heating wires into the first and second surfaces, respectively, engaging the first and second surfaces with the PE tube and the PE jacketed cable, respectively, and applying current to the first heating wires to heat proximal PE portions of the PE tube and the first section and to the second heating wires to heat proximal PE portions of the PE jacketed cable and the second section.

In accordance with additional or alternative embodiments, the first and second sections are annular and co-axial and the second section is thicker than the first section.

In accordance with additional or alternative embodiments, the embedding includes embedding the first heating wires in an outermost surface of the first surface and embedding the second heating wires in an innermost surface of the second surface.

In accordance with additional or alternative embodiments, the pre-forming includes forming the first section to define an array of additional bores and the embedding includes embedding additional heating wires additional surfaces at corresponding ones of the additional bores.

In accordance with additional or alternative embodiments, first and second plugs are pre-formed and used to join first and second PE jacketed cables to the PE tube.

In accordance with additional or alternative embodiments, the embedding, the engaging and the applying are completed in substantially less than one hour.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

For a more complete understanding of this disclosure, reference is now made to the following brief description, taken in connection with the accompanying drawings and detailed description, wherein like reference numerals represent like parts:

FIG. 1 is a side view of a plug for joining a polyethylene (PE) jacketed cable to a PE tube in accordance with embodiments;

FIG. 2 is an enlarged side view of heating wires embedded into surfaces of the plug of FIG. 1 in accordance with embodiments;

FIG. 6 is a flow diagram illustrating a method of joining a polyethylene (PE) jacketed cable to a PE tube in accordance with embodiments.

DETAILED DESCRIPTION

As will be described below, rapid fusion of pre-formed fittings to outer jackets of undersea cables is provided and makes use of heating wires that are embedded in the pre-formed fittings. The pre-formed fittings and the use of the embedded heating wires are relatively easy and inexpensive to control and achieve results in minutes instead of hours. The pre-formed fittings and the use of the embedded heating wires do not require pre-heating and will not violate high-temperature limits of internal components.

Figure 3:
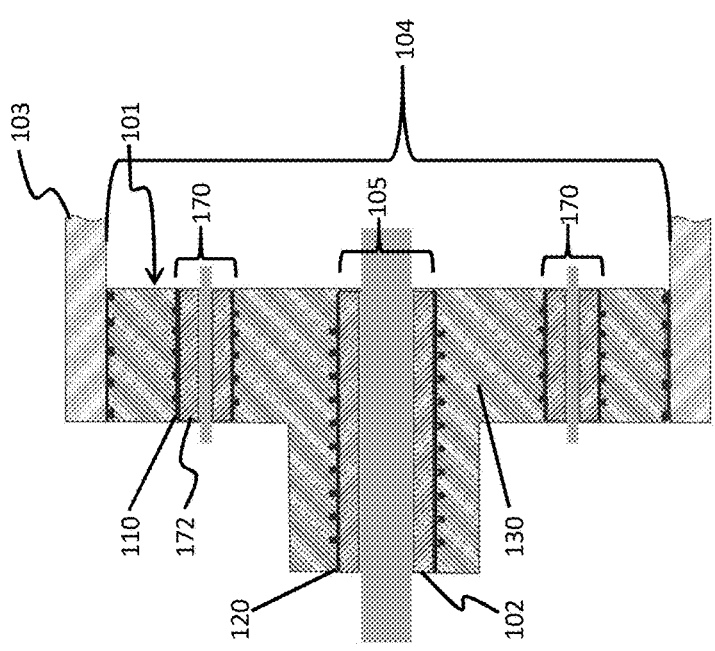
FIG. 3 is a side view of the plug of FIG. 1 with the PE jacketed cable and the PE tube.

With reference to FIGS. 1-4, a plug 101 for joining a polyethylene (PE) jacketed cable 102 (see FIG. 3) to a PE tube 103 (see FIG. 3) for undersea or other uses is provided. The plug includes first heating wires 110 (see FIGS. 2 and 3) and second heating wires 120 (see FIGS. 2 and 3) and a PE body 130. The PE body 130 includes a first section 140 and a second section 150. The first section 140 is insertible into a first bore 104 defined by the PE tube 103 as shown in FIG. 3 and includes a first surface 141 that is disposable for engagement with the PE tube 103 in the first bore 104. As shown in 2, the first heating wires 110 are embeddable in an outermost surface 142 of the first surface 141. The second section 150 is disposed within the first section 140 and is formed to define a second bore 105. The PE jacketed cable 102 is insertible into the second bore 105 of the second section 150. The second section 150 includes a second surface 151 that is disposable for engagement with the PE jacketed cable 102 in the second bore 105. The second heating wires 120 are embeddable in an innermost surface 152 of the second surface 151.

In accordance with embodiments, the first and second sections 140 and 150 may be annular or, in some cases, circular. The first and second sections 140 and 150 may also be co-axial with the second section 150 being thicker than the first section 140. In addition, the first surface 141 is annular or, in some cases, circular and the second surface 151 is annular or, in some cases, circular. In any cases, the first surface 141 generally faces radially outwardly and the second surface 151 generally faces radially inwardly.

In accordance with further embodiments, to the extent the first heating wires 110 are embeddable in the outermost surface 142 of the first surface 141, the first heating wires 110 may be equatorially embedded in the outermost surface 142 as shown in FIG. 2, substantially embedded in the outermost surface 142 or only partially embedded in the outermost surface 142. Similarly, to the extent the second heating wires 120 are embeddable in the innermost surface 152 of the second surface 151, the second heating wires 120 may be equatorially embedded in the innermost surface 152 as shown in FIG. 2, substantially embedded in the innermost surface 152 or only partially embedded in the innermost surface 152.

Figure 4:
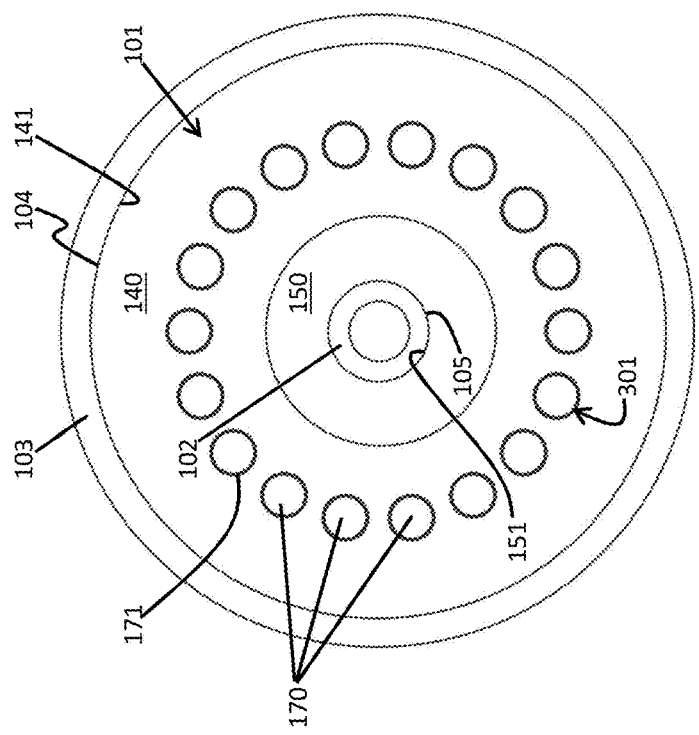
FIG. 4 is an axial view of the plug, the PE jacketed cable and the PE tube of FIG. 3.

In accordance with still further embodiments, the plug 101 can also include additional heating wires 160 and at least one of the first section 140 and the second section 150 can be formed to define one or more additional bores 170. As shown in FIGS. 1, 3 and 4, in at least one embodiment, the first section 140 is formed to define the one or more additional bores 170 in an annular array 301 (see FIG. 3) of additional bores 170 with additional innermost surfaces 171 in which the additional heating wires 160 are embeddable. As above, to the extent the additional heating wires 160 are embeddable in the additional innermost surfaces 171, the second heating wires 120 may be equatorially embedded in the additional innermost surfaces 171, substantially embedded in the additional innermost surfaces 171 or only partially embedded in the additional innermost surfaces 171. Each of the additional bores 170 is receptive of an additional PE jacketed cable 172 (see FIG. 3) which may be smaller in diameter than the PE jacketed cable 102.

Figure 5:
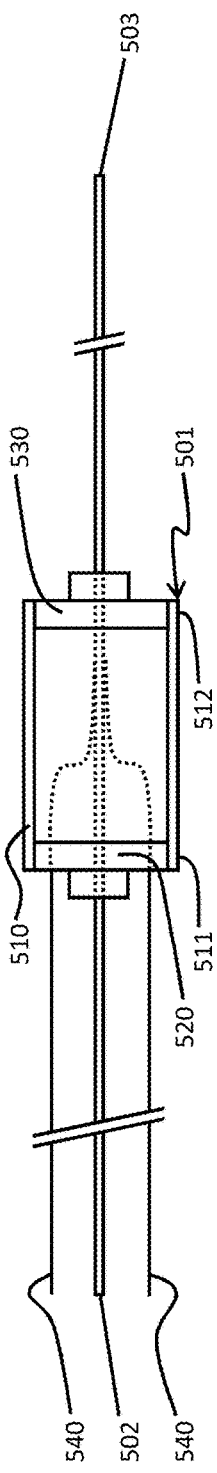
FIG. 5 is a schematic side view of plugs used to join PE jacketed cables to a PE tube.

With continued reference to FIGS. 1-4 and with additional reference to FIG. 5, an assembly 501 for joining first and second PE jacketed cables 502 and 503 is provided. As shown in FIG. 5, the assembly 501 includes a PE tube 510, a first plug 520 and a second plug 530. The PE tube 510 has a first end 511 and a second end 512 opposite the first end 511. The first and second plugs 520 and 530 are substantially similarly configured as the plug 101 described above. That is, the first and second plugs 520 and 530 each includes the first and second heating wires 110 and 120 (see FIG. 3) and the PE body 130, where the PE body 130 includes the first and second sections 140 and 150 (see FIG. 1). The first section 140 of the first plug 520 is insertible into the first end 511 of the PE tube 510 and the first section 140 of the second plug 530 is insertible into the second end 512 of the PE tube 510. The first PE jacketed cable 502 is insertible into the second section 150 of the first plug 520 and the second PE jacketed cable 503 is insertible into the second section 150 of the second plug 530.

In accordance with further embodiments and as shown in FIG. 5, additional (relatively small-diameter) PE jacketed cables 540 may be received within an array of additional bores (i.e., the additional bores 170 of FIG. 3) that are formed in at least the first plug 520. These additional PE jacketed cables 540 can be combined with the first and second PE jacketed cables 502 and 503 within the PE tube 510 as shown in FIG. 5 and/or with additional PE jacketed cables received within additional bores of the second plug 530.

In any case, the first and second heating wires 110 and 120 can be electrically coupled with a voltage source such that current (e.g., direct current (DC) or alternating current (AC)) can be applied to the first and second heating wires 110 and 120. When this occurs, the current heats the first and second heating wires 110 and 120 and causes the proximal PE portions of the PE jacketed cable 102, the PE tube 103 and the PE body 130 of the plug 101 to melt and then, once the application of the current is ceased, re-harden and thus bond with one another, respectively. The time for completing this bonding process can be reduced to substantially less than one hour or to a time period on the order of only a few minutes. This time period represents a substantial reduction in processing time as compared to conventional processes.

With reference to FIG. 6, a method of joining a PE jacketed cable to a PE tube is provided. The method includes pre-forming a plug with a PE body (601) such that the PE body includes a first section, which is insertible into the PE tube and which includes a first surface, a second section, which is within the first section and into which the PE jacketed cable is insertible and which includes a second surface. The method further includes embedding first heating wires into an outermost surface of the first surface and embedding second heating wires into an innermost surface of the second surface (602) and engaging the first surface with the PE tube and engaging the second surface with the PE jacketed cable (603). In addition, the method includes applying current to the first heating wires to heat proximal PE portions of the PE tube and the first section and to the second heating wires to heat proximal PE portions of the PE jacketed cable and the second section (604).

In accordance with embodiments, the first and second sections may be annular and co-axial and the second section may be thicker than the first section. In addition, the pre-forming may also include forming the first section to define an array of additional bores with the embedding further including embedding additional heating wires additional surfaces at corresponding ones of the additional bores.

In accordance with still further embodiments, first and second plugs can be pre-formed and used to join first and second PE jacketed cables to the PE tube. In any case, the embedding, the engaging and the applying can be completed in substantially less than one hour or in a period of time on the order of minutes. This period of time would represent a substantial reduction in processing time as compared to conventional processes.

In a particular operation of the features described herein, where first and second PE jacketed cables are to be joined for undersea usage, the first and second plugs can be transported to the location in the ocean where the first and second PE jacketed cables are to be joined. In such cases, the first and second plugs can be pre-formed on land so as to avoid having to expend sailing time processing or forming the plugs. In this way, the joining of the first and second PE jacketed cables with the PE tube using the first and second plugs requires only the insertion of the first and second plugs into the PE tube, the insertion of the PE jacketed cables into the first and second plugs and the heating of the first and second heating wires of each of the first and second plugs. As noted above, this process can be completed in only a few minutes.

Technical benefits and advantages of the features described herein are the provision of plugs for facilitating the joining of PE jacketed cables to each other within an encasement for undersea usage in an amount of time that is substantially reduced as compared to conventional processes.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

While the preferred embodiments to the invention have been described, it will be understood that those skilled in the art, both now and in the future, may make various improvements and enhancements which fall within the scope of the claims which follow. These claims should be construed to maintain the proper protection for the invention first described.

What is claimed is:

1. A plug for joining a polyethylene (PE) jacketed cable to a PE tube, the plug comprising:
    first and second heating wires; and
    a PE body comprising:
        a first section insertible into the PE tube and comprising a first surface to engage with the PE tube and in which the first heating wires are embeddable; and
        a second section within the first section and into which the PE jacketed cable is insertible, the second section comprising a second surface to engage with the PE jacketed cable and in which the second heating wires are embeddable.

2. The plug according to claim 1, wherein the first and second sections are annular and co-axial and the second section is thicker than the first section.

3. The plug according to claim 1, wherein the first surface is annular and faces radially outwardly and the second surface is annular and faces radially inwardly.

4. The plug according to claim 1, wherein the first heating wires are embeddable in an outermost surface of the first surface and the second heating wires are embeddable in an innermost surface of the second surface.

5. The plug according to claim 1, wherein the PE tube is formed to define a first bore receptive of the PE body and the second section is formed to define a second bore receptive of the PE jacketed cable.

6. The plug according to claim 1, further comprising additional heating wires,
wherein at least one of the first section and the second section is formed to define one or more additional bores and the at least one of the first section and the second section has one or more additional surfaces at corresponding ones of the one or more additional bores in which the additional heating wires are embeddable.

7. The plug according to claim 6, wherein the first section is formed to define the one or more bores as an annular array and each of the one or more of the additional bores is receptive of an additional PE jacketed cable which is smaller in diameter than the PE jacketed cable.

8. An assembly for joining first and second polyethylene (PE) jacketed cables, the assembly comprising:
a PE tube having first and second ends; and
first and second plugs, each of which comprises:
first and second heating wires; and
a PE body comprising:
a first section insertible into one of the first and second ends of the PE tube and comprising a first surface to engage with the one of the first and second ends of the PE tube and in which the first heating wires are embeddable; and
a second section within the first section and into which one of the first and second PE jacketed cables is insertible, the second section comprising a second surface to engage with the one of the first and second PE jacketed cables and in which the second heating wires are embeddable.

9. The assembly according to claim 8, wherein the first and second sections are annular and co-axial and the second section is thicker than the first section.

10. The assembly according to claim 8, wherein the first surface is annular and faces radially outwardly and the second surface is annular and faces radially inwardly.

11. The assembly according to claim 8, wherein the first heating wires are embeddable in an outermost surface of the first surface and the second heating wires are embeddable in an innermost surface of the second surface.

12. The assembly according to claim 8, wherein the PE tube is formed to define a first bore receptive of the PE body and the second section is formed to define a second bore receptive of the PE jacketed cable.

13. The assembly according to claim 8, further comprising additional heating wires,
wherein at least one of the first section and the second section is formed to define one or more additional bores and the at least one of the first section and the second section has one or more additional surfaces at corresponding ones of the one or more additional bores in which the additional heating wires are embeddable.

14. The assembly according to claim 13, wherein the first section is formed to define the one or more bores as an annular array and each of the one or more of the additional bores is receptive of an additional PE jacketed cable which is smaller in diameter than the PE jacketed cable.

15. A method of joining a polyethylene (PE) jacketed cable to a PE tube, the method comprising:
pre-forming a plug with a PE body comprising:
a first section insertible into the PE tube and comprising a first surface; and
a second section within the first section and into which the PE jacketed cable is insertible and comprising a second surface;
embedding first and second heating wires into the first and second surfaces, respectively;
engaging the first and second surfaces with the PE tube and the PE jacketed cable, respectively; and
applying current to the first heating wires to heat proximal PE portions of the PE tube and the first section and to the second heating wires to heat proximal PE portions of the PE jacketed cable and the second section.

16. The method according to claim 15, wherein the first and second sections are annular and co-axial and the second section is thicker than the first section.

17. The method according to claim 15, wherein the embedding comprises embedding the first heating wires in an outermost surface of the first surface and embedding the second heating wires in an innermost surface of the second surface.

18. The method according to claim 15, wherein the pre-forming comprises forming the first section to define an array of additional bores and the embedding comprises embedding additional heating wires additional surfaces at corresponding ones of the additional bores.

19. The method according to claim 15, wherein first and second plugs are pre-formed and used to join first and second PE jacketed cables to the PE tube.

20. The method according to claim 15, wherein the embedding, the engaging and the applying are completed in substantially less than one hour.

* * * * *